(12) United States Patent
Wang

(10) Patent No.: US 6,509,655 B1
(45) Date of Patent: Jan. 21, 2003

(54) SYSTEM INCLUDING ELECTRONICALLY-CONTROLLED POWER STRIP HAVING A PLURALITY OF RECEPTACLES

(76) Inventor: Peace Wang, No. 111-4, Lane 167, TS'U Hsiu N. Road, Chang Hua City, Chang Hua Hsien (TW)

( * ) Notice: Subject to any disclaimer, the term of this patent is extended or adjusted under 35 U.S.C. 154(b) by 24 days.

(21) Appl. No.: 09/584,667

(22) Filed: Jun. 1, 2000

(51) Int. Cl.⁷ ................................................. H02J 1/00
(52) U.S. Cl. ............................ 307/31; 307/38; 307/126
(58) Field of Search .......................... 307/38, 112, 117, 307/116, 126, 31; 361/141, 160, 119, 187; 700/14, 79

(56) References Cited

U.S. PATENT DOCUMENTS

| | | | | |
|---|---|---|---|---|
| 3,416,001 A | * | 12/1968 | Fistell | 307/38 |
| 4,392,089 A | * | 7/1983 | Lester et al. | 315/208 |
| 4,674,031 A | * | 6/1987 | Siska, Jr. | 364/184 |
| 4,970,623 A | * | 11/1990 | Pintar | 361/187 |
| 5,250,851 A | * | 10/1993 | McKnight et al. | 248/346.5 |
| 5,321,817 A | * | 6/1994 | Feinstein | 703/25 |
| 5,408,668 A | * | 4/1995 | Tornai | 713/324 |
| 5,565,714 A | * | 10/1996 | Cunningham | 307/112 |
| 5,579,201 A | * | 11/1996 | Karageozian | 361/119 |
| 5,615,107 A | * | 3/1997 | DeAngelis | 364/141 |
| 5,814,902 A | * | 9/1998 | Creasy et al. | 307/116 |
| 5,872,832 A | * | 2/1999 | Bishel et al. | 379/39 |
| 5,923,103 A | * | 7/1999 | Pulizzi et al. | 307/126 |
| 6,211,581 B1 | * | 4/2001 | Farrant | 301/117 |

OTHER PUBLICATIONS

David Pogue, PowerKey Pro 600—Power strip for gadget freaks, MacWorld, Sep. 1997, p. 87.*
Gadgets Can Transfrom Your Environment—Absolute Power, Macworld, Feb. 1998, p. 91.*
Dataprobe, Remote Switch Control, CodePAL & Multi-PAL.*
S. Davis, Pick A Strip, Telephony, Mar. 1997, p. 56.*

* cited by examiner

Primary Examiner—Brian Sircus
Assistant Examiner—Sharon Polk
(74) Attorney, Agent, or Firm—Browdy and Neimark, P.L.L.C.

(57) ABSTRACT

A power delivery control system includes a main receptacle and a plurality of secondary receptacles. Each receptacle is provided with a conductive member which is connected with a power source line via a respective one of a plurality of electrically-controlled switches. The power source line is connected to a power source. The electrically controlled switches are connected with a control unit for receiving an external electronic signal to bring about a control signal for controlling the electrically-controlled switches which in turn control the power supply between the power source line and the conductive members of the secondary receptacles.

14 Claims, 6 Drawing Sheets

SYSTEM INCLUDING ELECTRONICALLY-CONTROLLED POWER STRIP HAVING A PLURALITY OF RECEPTACLES

FIELD OF THE INVENTION

The present invention relates generally to an electrical outlet, and more particularly to an electrical outlet which is controlled by electronic signal and is provided with a plurality of receptacles for receiving a plurality of plugs at the same time.

BACKGROUND OF THE INVENTION

As shown in FIG. 1, an electrical outlet 80 of the prior art is provided with a plurality of receptacles 81, 82, a switch circuit device 83, and a current detection circuit 85. The switching of the appliance plugged into the main receptacle 81 controls the switching of other appliances plugged into the receptacles 82.

The prior art electrical outlet 80 is defective in design in that all appliances are switched simultaneously, and that the appliances can not be switched independently. For example, a computer is plugged into the main receptacle 81, whereas the peripheral equipments are plugged into the receptacles 82. Some of the peripheral equipments may not be used along with the computer. As long as the computer is turned on, all peripheral equipments are switched on along with the computer, thereby resulting in the energy waste.

SUMMARY OF THE INVENTION

The primary objective of the present invention is to provide an electrical outlet with a plurality of receptacles which are independently controlled in supplying power.

It is another objective of the present invention to provide an electrical outlet with a plurality of receptacles which are electronically controlled in supplying power.

The features and the advantages of the present invention will be readily understood upon a thoughtful deliberation of the following detailed description of the preferred embodiments of the present invention with reference to the accompanying drawings.

DETAILED DESCRIPTION OF THE INVENTION

Figure 1:
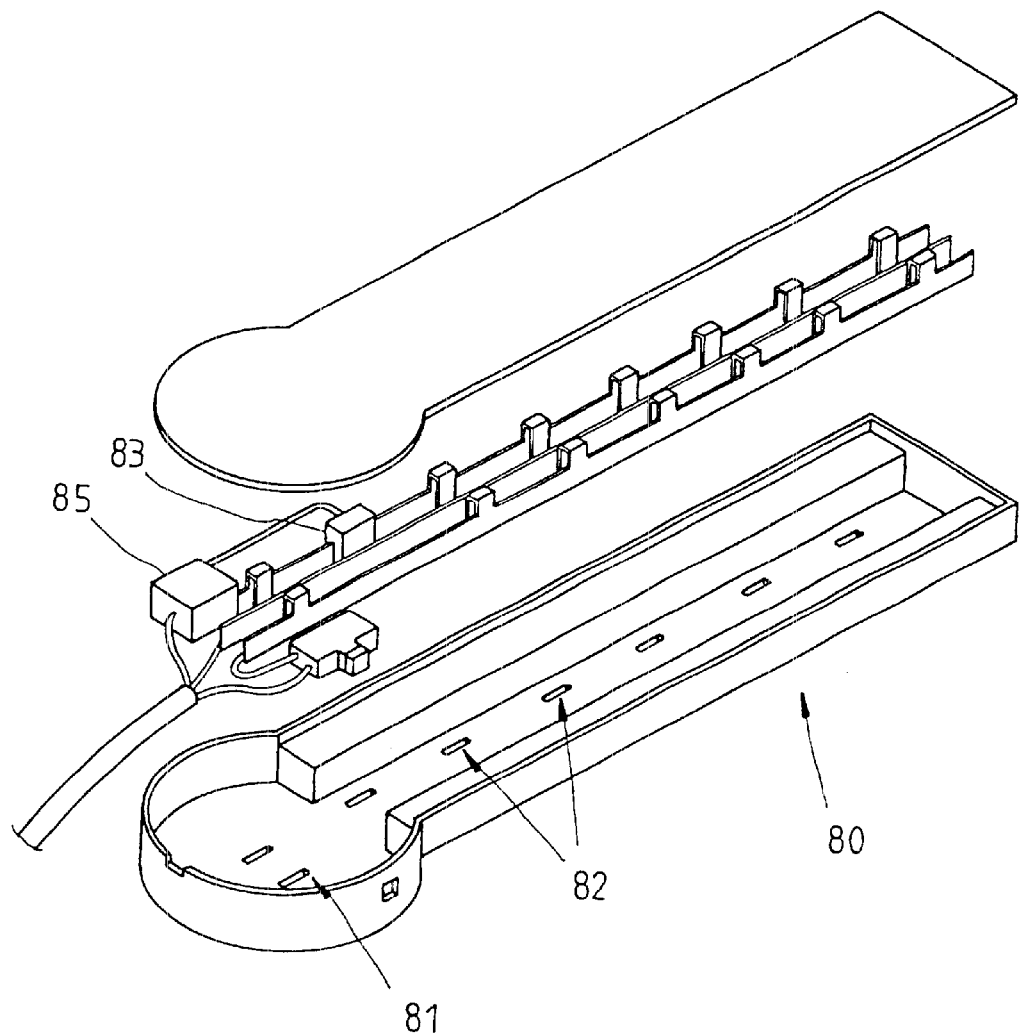
FIG. 1 shows a schematic view of an electrical outlet of the prior art.
Figure 2:
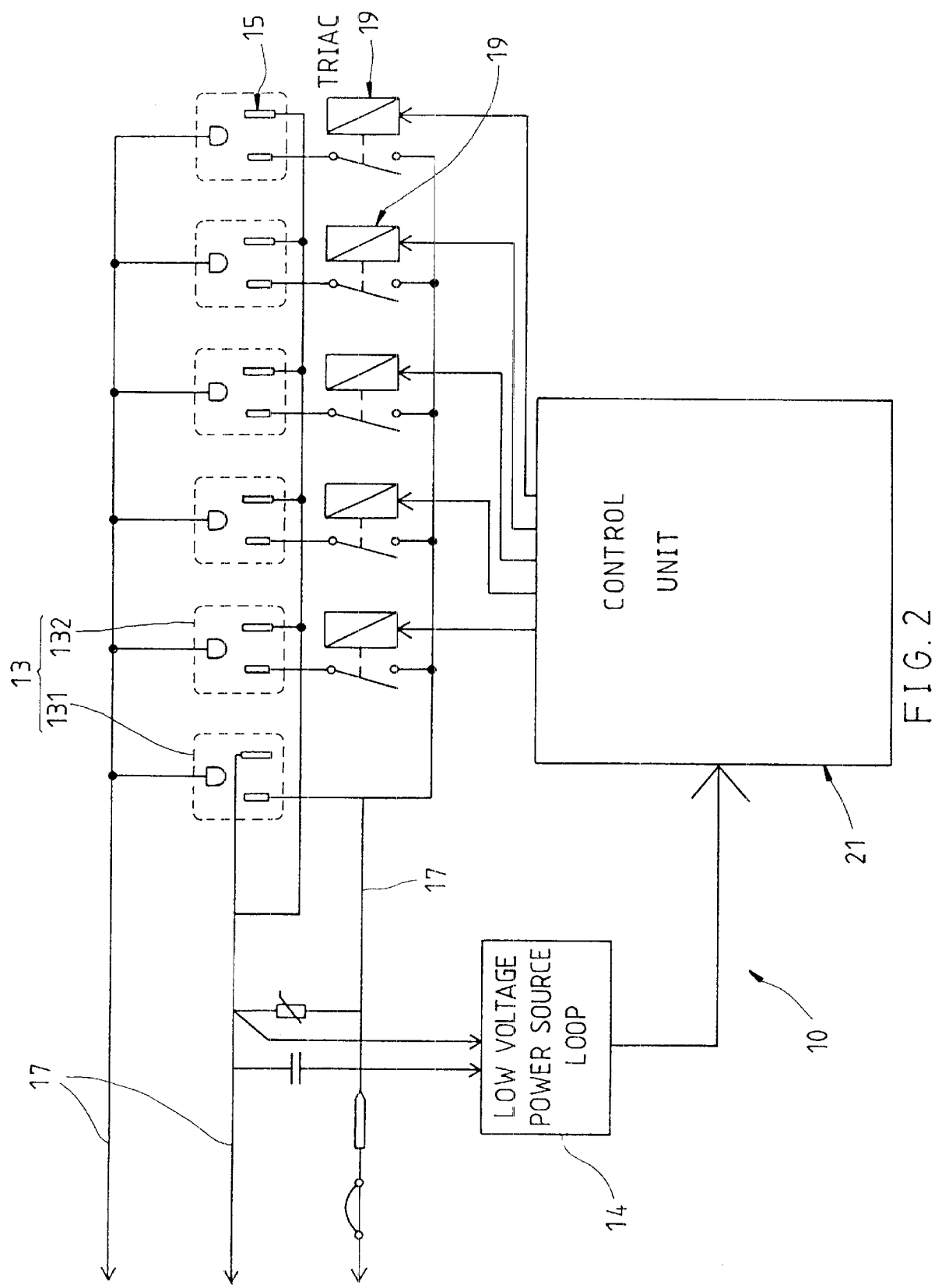
FIG. 2 shows a schematic view of a circuitry of a first preferred embodiment of the present invention.
Figure 3:
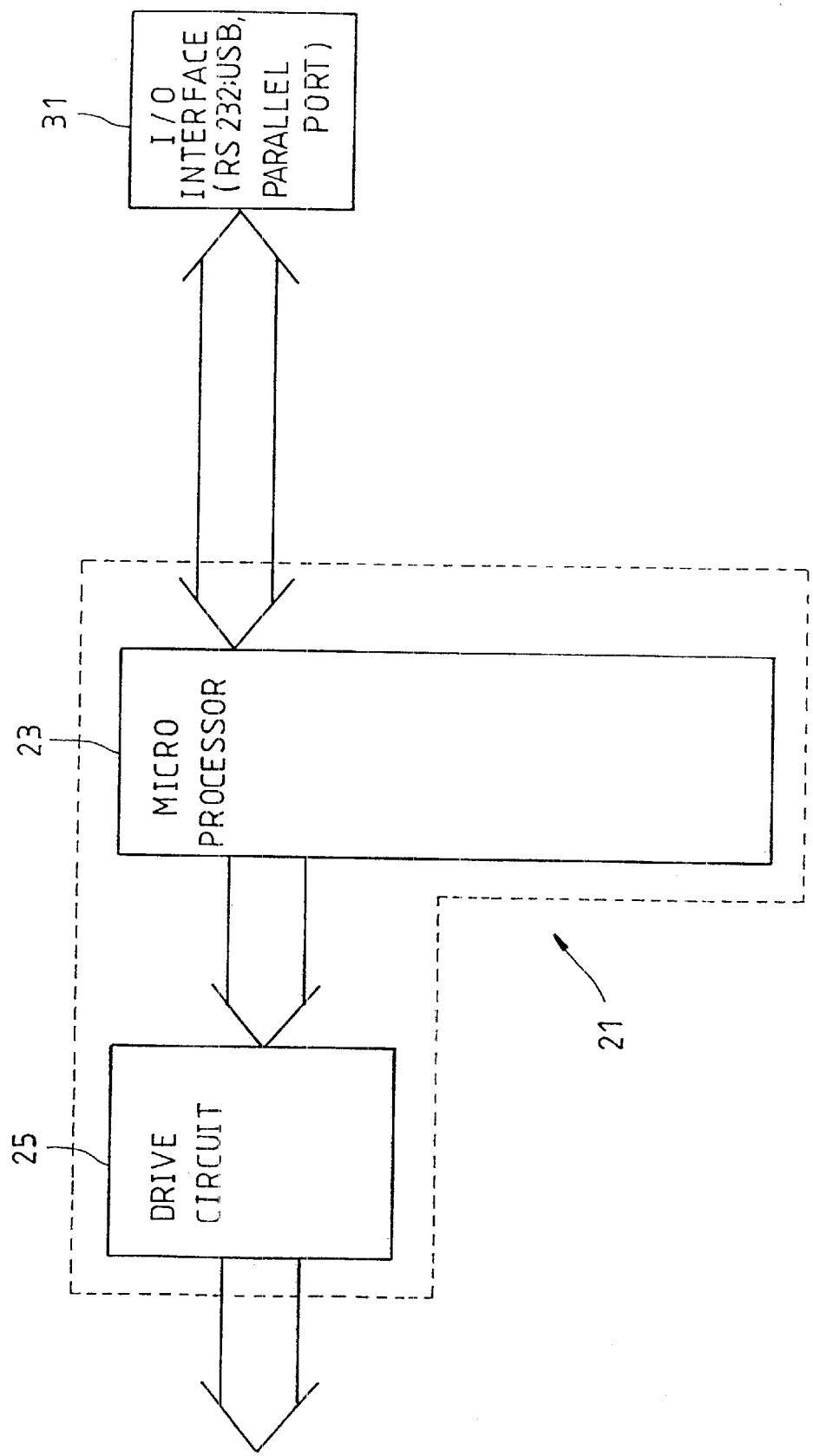
FIG. 3 shows a circuit block diagram of a control unit of the first preferred embodiment of the present invention.
Figure 4:
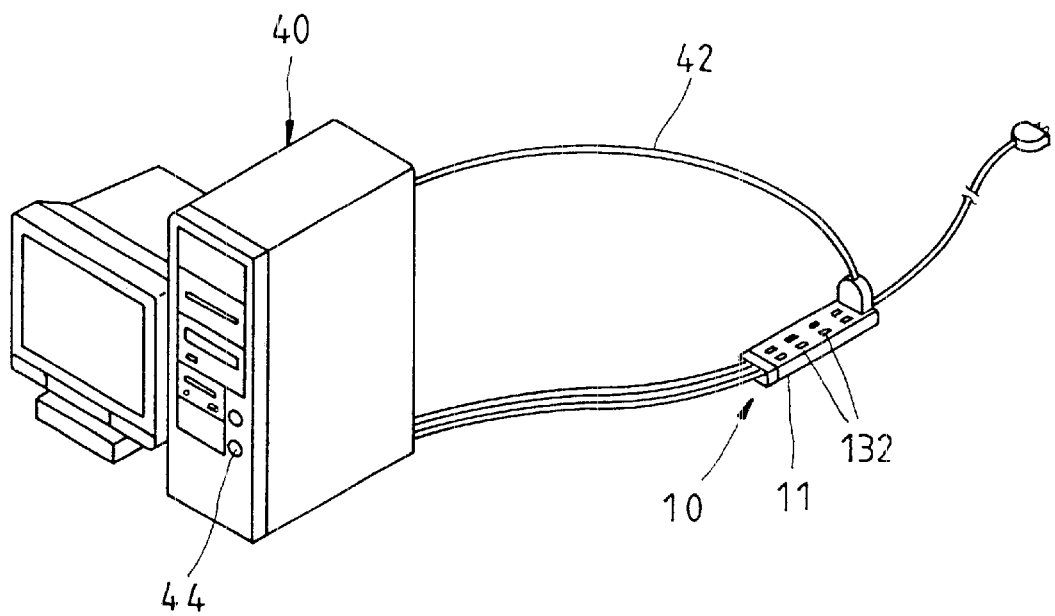
FIG. 4 shows a schematic view of the first preferred embodiment of the present invention at work.

As shown in FIGS. 2–4, an electrical outlet 10 of the first preferred embodiment of the present invention is formed of a plurality of receptacles 13, a plurality of power source wires 17, and a control unit 21.

The receptacles 13 comprise a main receptacle 131 and a plurality of secondary receptacles 132, which are disposed on a housing 11. The housing 11 is provided with a plurality of conductive members 15 corresponding in location to the receptacles 13.

The power source wires 17 are disposed in the housing 11 for connecting the power source and are connected with the conductive members 15. The conductive members 15 of the secondary receptacles 132 are respectively connected with the power source wires 17 via a control switch 19, which is a relay.

The control unit 21 is disposed in the housing 11 and is provided with a microprocessor 23 and a drive circuit 25 connected with the microprocessor 23 and the relays 19. The relays 19 are driven by the drive circuit 25 to control the secondary receptacles 132.

The conductive member 15 of the main receptacle 131 is connected with the control unit 21 via a low voltage power source loop 14 for detecting the state of the power supply to the appliance which is plugged into the main receptacle 131. The low voltage power source loop 14 is not the feature of the present invention.

The present invention further comprises an output-input interface 31, which is a PC RS232 interface and is connected with the microprocessor 23. By using a personal computer, a person can transmit an electronic signal to the microprocessor 23 via the output-input interface 31 for controlling the power supply to the appliances which are plugged into the secondary receptacles 132. A mouse may be used to do the selective controls of the power supply to the appliances.

As shown in FIG. 4, the present invention is connected with the output-input interface 31 via a connection line 41. The output-input interface 31 is disposed in the housing 11. The power source line 42 of the PC 40 is connected with the main receptacle 131. In view of the main receptacle 131 being in the constant state of power supply, the computer 40 can be booted by pressing a switch 44 of the computer 40. After the booting of the computer 40, the control of power supply to each of the secondary receptacles 132 can be carried out by the mouse or keyboard.

Figure 6:
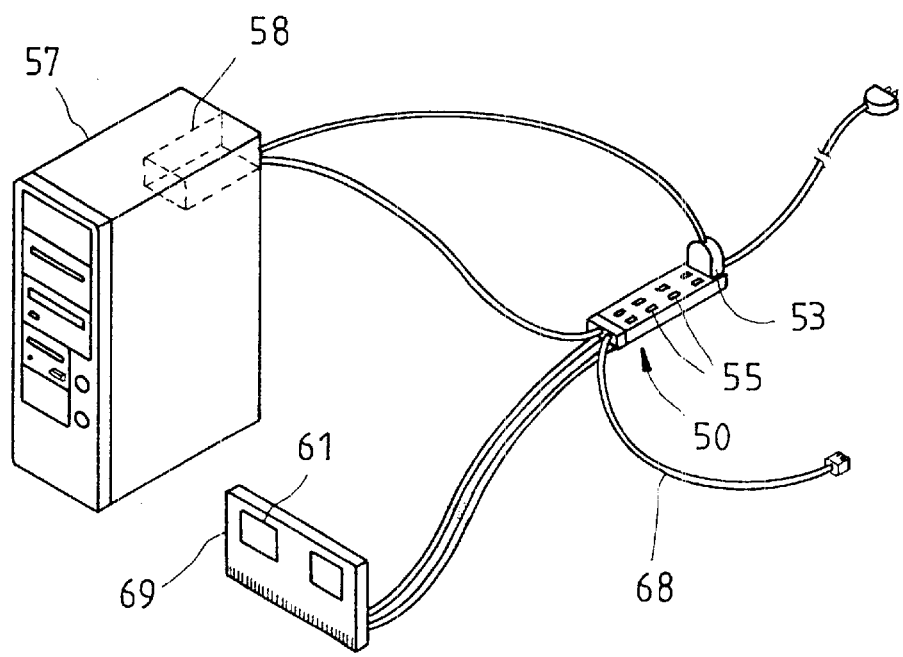
FIG. 6 shows a schematic view of the second preferred embodiment of the present invention at work.
Figure 5:
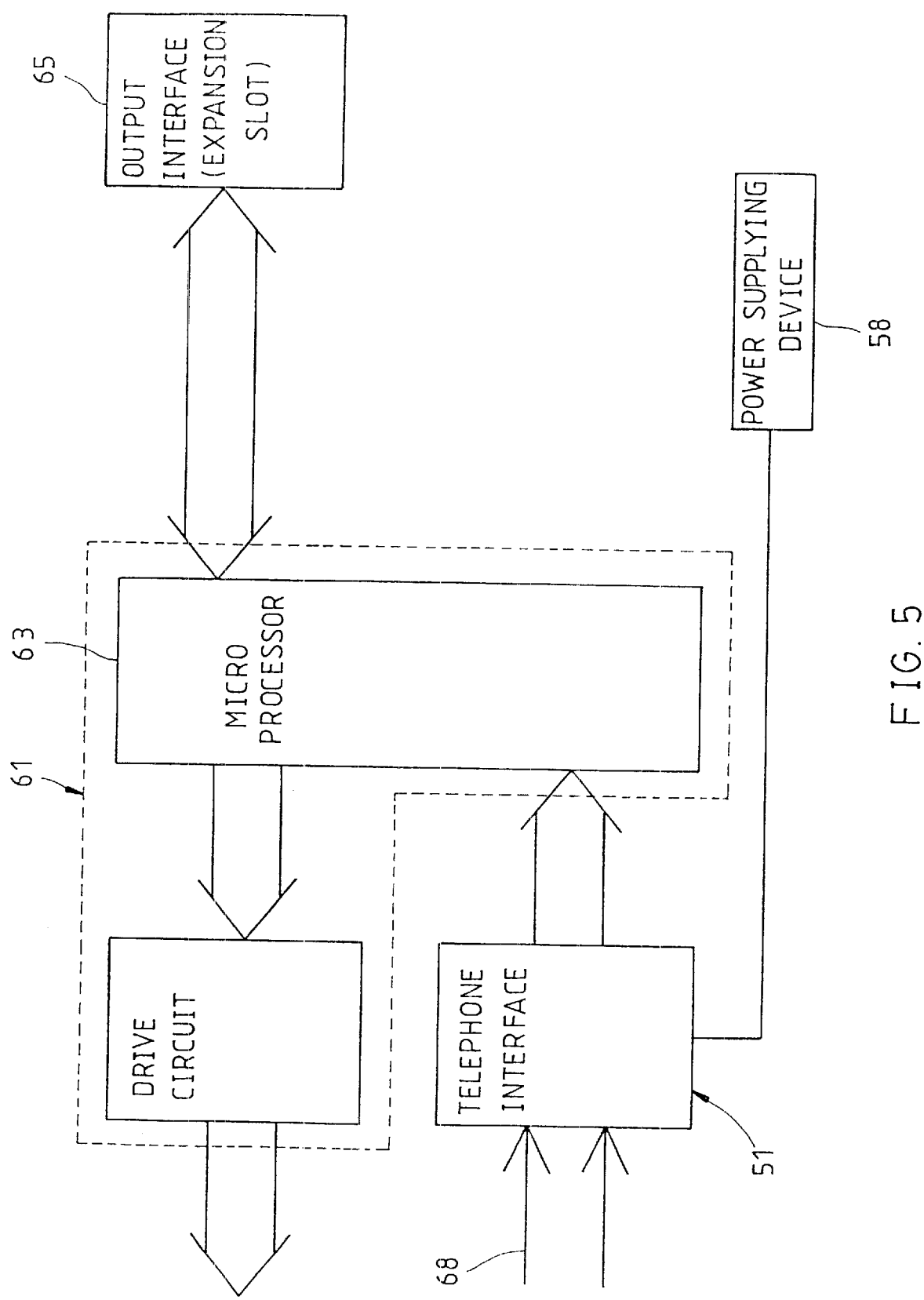
FIG. 5 shows a circuit block diagram of a second preferred embodiment of the present invention.

As shown in FIGS. 5 and 6, an electrical outlet 50 of the second preferred embodiment of the present invention is different from the electrical outlet 10 of the first preferred embodiment of the present in that the former comprises a telephone interface 51, which is connected with the microprocessor 63. The microprocessor 63 can be connected with an outside telephone line 68 via the telephone interface 51 which is in turn connected with a power supplying device 58 of a personal computer 57.

The output interface 65 is an expansion slot of the personal computer. The control unit 61 is disposed on an interface card 69 for plugging on the expansion slot.

When the power supply line of the personal computer is plugged into the main receptacle 53, the microprocessor 63 can be controlled by the telephone via the telephone interface 51 such that the power supplying device 58 is started. As a result, the personal computer 57 can be booted. In light of the power supply to the main receptacle 53 being kept on after the booting of the computer, the power supply to the secondary receptacles 55 can be controlled by the telephone key signal via the microprocessor 63.

Figure 7:
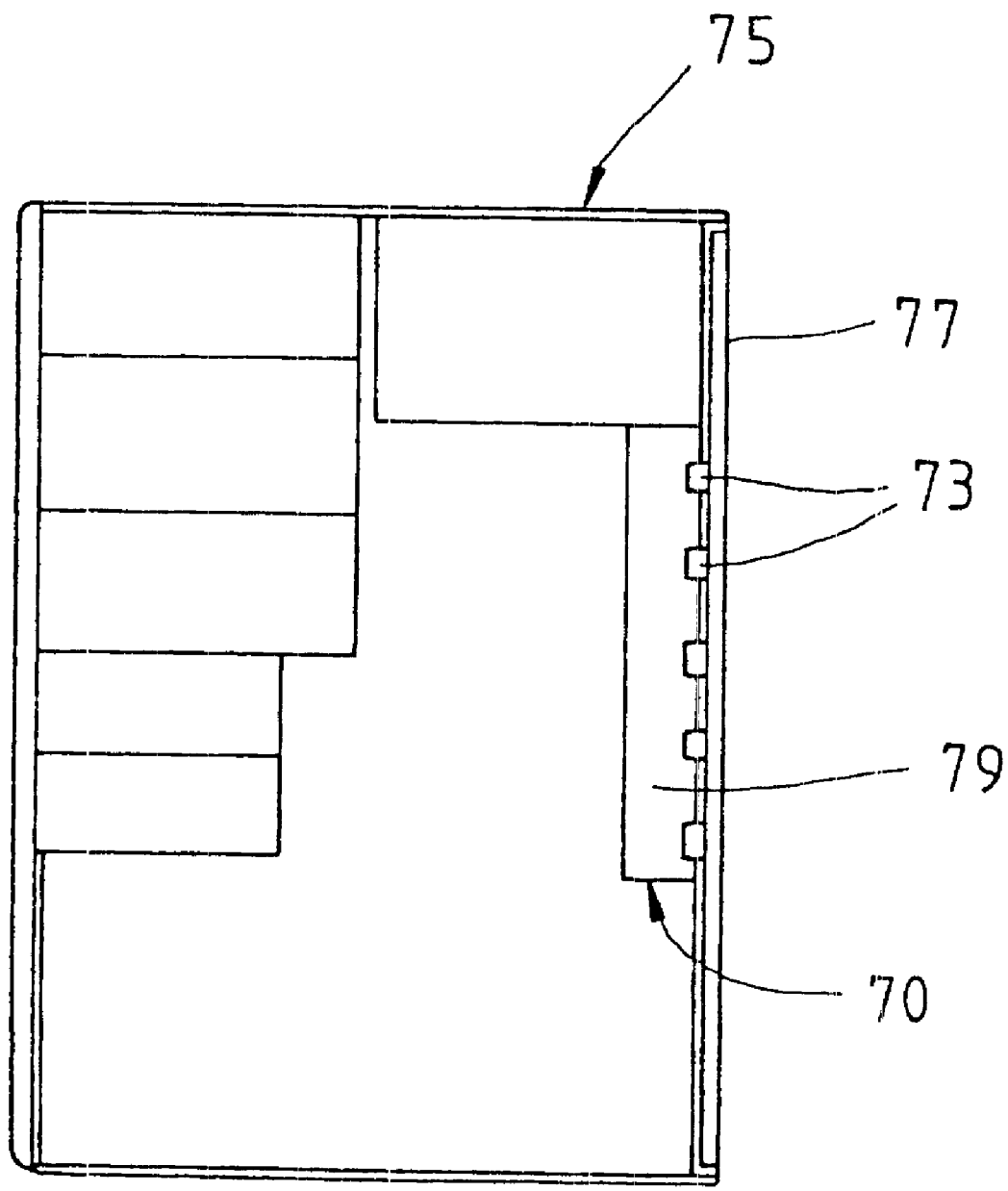
FIG. 7 shows a schematic view of a third preferred embodiment of the present invention at work.

As shown in FIG. 7, an electrical outlet 70 of the third preferred embodiment of the present invention is different from the electrical outlet 50 in that the former comprises the receptacles 73 which are disposed on the back of the housing 77 of a personal computer 75. The housing 77 is provided therein with a receiving space 79 in which the conductive members, power source line, control switch, and the control unit are disposed. In other words, the electrical outlet 70 is incorporated into the personal computer 75.

The output-input interface 31 may be a personal computer USB interface, or parallel port interface.

The electrically-controlled switch 19 of the present invention may be a TRIAC.

What is claimed is:

1. A power delivery control system comprising:

a power strip having a main receptacle having a conductive member and a plurality of secondary receptacles, each having a conductive member;

a power source line connected with the conductive member of said main receptacle;

a plurality of electrically-controlled switches, each connected between said power source line and said conductive member of a respective one of said secondary receptacles;

a personal computer; and a control unit connected between said personal computer and said electrically-controlled switches for receiving external electronic signals from said personal computer to produce control signals corresponding to the external electronic signals for controlling said electrically-controlled switches which in turn control the power supply between said power source line and said conductive member of each of said secondary receptacles when power is being supplied to said main receptacle.

2. The system as defined in claim 1, further comprising a housing, and wherein said main receptacle, said secondary receptacles, said conductive members, said power source line, said electrically-controlled switches, and said control unit are disposed in said housing.

3. The system as defined in claim 1 further comprising an output-input interface connecting said control unit to said computer.

4. The system as defined in claim 3, wherein said output-input interface is a personal computer RS232 interface.

5. The system as defined in claim 3, wherein said output-input interface is a personal computer USB interface.

6. The system as defined in claim 3, wherein said output-input interface is a personal computer parallel port interface.

7. The system as defined in claim 3, wherein said output-input interface is a personal computer expansion slot.

8. The system as defined in claim 1, wherein said control unit is disposed on an interface card whereby said interface card is plugged into a personal computer expansion slot.

9. The system as defined in claim 1, wherein said control unit has a microprocessor and a drive circuit connected with said microprocessor and said electrically-controlled switches.

10. The system as defined in claim 1, wherein said electrically-controlled switches are relays.

11. The system as defined in claim 1, wherein each of said electrically-controlled switches is a TRIAC.

12. The system as defined in claim 1 further comprising a telephone interface connected with said control unit to enable said control unit to be externally connected with a telephone line.

13. The system as defined in claim 12, wherein said telephone interface is connected with a power supplying device of said computer to facilitate the control of said power supplying device by a telephone key signal.

14. The system as defined in claim 1, wherein said main receptacle and said secondary receptacles are disposed accessibly on a housing of the computer whereby said housing is provided therein with a receiving space; and wherein said conductive members, said power source lines, said electrically-controlled switches, and said control unit are disposed in said receiving space of said housing.

* * * * *